United States Patent
Ricci

(10) Patent No.: US 7,111,228 B1
(45) Date of Patent: Sep. 19, 2006

(54) SYSTEM AND METHOD FOR PERFORMING PARITY CHECKS IN DISK STORAGE SYSTEM

(75) Inventor: Paul B. Ricci, Coto De Caza, CA (US)

(73) Assignee: Marvell International Ltd., Hamilton (BM)

( * ) Notice: Subject to any disclaimer, the term of this patent is extended or adjusted under 35 U.S.C. 154(b) by 525 days.

(21) Appl. No.: 10/429,495

(22) Filed: May 5, 2003

Related U.S. Application Data

(60) Provisional application No. 60/378,471, filed on May 7, 2002.

(51) Int. Cl.
G11B 20/18 (2006.01)
H03M 13/09 (2006.01)

(52) U.S. Cl. ..................... 714/805; 714/807
(58) Field of Classification Search ................. 714/758, 714/770, 807, 805
See application file for complete search history.

(56) References Cited

U.S. PATENT DOCUMENTS

| | | | |
|---|---|---|---|
| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle et al. |
| 4,156,867 A | 5/1979 | Bench et al. |
| 4,225,960 A | 9/1980 | Masters |
| 4,275,457 A | 6/1981 | Leighou et al. |
| 4,390,969 A | 6/1983 | Hayes |
| 4,451,898 A | 5/1984 | Palermo et al. |
| 4,486,750 A | 12/1984 | Aoki |
| 4,500,926 A | 2/1985 | Yoshimaru et al. |
| 4,587,609 A | 5/1986 | Boudreau et al. |
| 4,603,382 A | 7/1986 | Cole |
| 4,625,321 A | 11/1986 | Pechar et al. |
| 4,667,286 A | 5/1987 | Young et al. |
| 4,777,635 A | 10/1988 | Glover |
| 4,805,046 A | 2/1989 | Kuroki et al. |
| 4,807,116 A | 2/1989 | Katzman et al. |
| 4,807,253 A | 2/1989 | Hagenauer et al. |
| 4,809,091 A | 2/1989 | Miyazawa et al. |
| 4,811,282 A | 3/1989 | Masina |
| 4,812,769 A | 3/1989 | Agoston |
| 4,860,333 A | 8/1989 | Bitzinger et al. |
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |

(Continued)

FOREIGN PATENT DOCUMENTS

EP    0528273    2/1993

(Continued)

OTHER PUBLICATIONS

PCT International Search Report, Doc. No. PCT/US00/15084, Dated Nov. 15, 2000, 2 Pages.

(Continued)

*Primary Examiner*—Stephen M. Baker

(57) ABSTRACT

A system for maintaining cyclic redundancy check ("CRC") protection of XOR'ed data sectors includes a register that is initialized with a non-zero seed value used for generating sector CRC values. The system includes logic for combining CRC values of at least two sectors and storing a result of the combination modified with a non-zero seeded CRC value.

7 Claims, 5 Drawing Sheets

U.S. PATENT DOCUMENTS

| | | |
|---|---|---|
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley et al. |
| 5,088,093 A | 2/1992 | Storch et al. |
| 5,109,500 A | 4/1992 | Iseki et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama et al. |
| 5,280,488 A | 1/1994 | Glover et al. |
| 5,285,327 A | 2/1994 | Hetzler |
| 5,285,451 A | 2/1994 | Henson et al. |
| 5,301,333 A | 4/1994 | Lee |
| 5,307,216 A | 4/1994 | Cook et al. |
| 5,315,708 A | 5/1994 | Eidler et al. |
| 5,339,443 A | 8/1994 | Lockwood |
| 5,361,266 A | 11/1994 | Kodama et al. |
| 5,361,267 A | 11/1994 | Godiwala et al. |
| 5,408,644 A | 4/1995 | Schneider et al. |
| 5,420,984 A | 5/1995 | Good et al. |
| 5,428,627 A | 6/1995 | Gupta |
| 5,440,751 A | 8/1995 | Santeler et al. |
| 5,465,343 A | 11/1995 | Henson et al. |
| 5,487,170 A | 1/1996 | Bass et al. |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt et al. |
| 5,507,005 A | 4/1996 | Kojima et al. |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini et al. |
| 5,546,545 A | 8/1996 | Rich |
| 5,546,548 A | 8/1996 | Chen et al. |
| 5,563,896 A | 10/1996 | Nakaguchi |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato et al. |
| 5,588,012 A * | 12/1996 | Oizumi .................. 714/805 |
| 5,592,404 A | 1/1997 | Zook |
| 5,600,662 A | 2/1997 | Zook et al. |
| 5,602,857 A | 2/1997 | Zook et al. |
| 5,615,190 A | 3/1997 | Best et al. |
| 5,623,672 A | 4/1997 | Popat |
| 5,626,949 A | 5/1997 | Blauer et al. |
| 5,627,695 A | 5/1997 | Prins et al. |
| 5,640,602 A | 6/1997 | Takase |
| 5,649,230 A | 7/1997 | Lentz |
| 5,664,121 A | 9/1997 | Cerauskis |
| 5,689,656 A | 11/1997 | Baden et al. |
| 5,691,994 A | 11/1997 | Acosta et al. |
| 5,692,135 A | 11/1997 | Alvarez, II et al. |
| 5,692,165 A | 11/1997 | Jeddeloh et al. |
| 5,696,775 A * | 12/1997 | Nemazie et al. .......... 714/805 |
| 5,719,516 A | 2/1998 | Sharpe-Geisler |
| 5,729,718 A | 3/1998 | Au |
| 5,740,466 A | 4/1998 | Geldman |
| 5,745,793 A | 4/1998 | Atsatt et al. |
| 5,754,759 A | 5/1998 | Clarke et al. |
| 5,758,188 A | 5/1998 | Appelbaum et al. |
| 5,784,569 A | 7/1998 | Miller et al. |
| 5,794,073 A | 8/1998 | Ramakrishnan et al. |
| 5,801,998 A | 9/1998 | Choi |
| 5,818,886 A | 10/1998 | Castle |
| 5,822,142 A | 10/1998 | Hicken |
| 5,831,922 A | 11/1998 | Choi |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,937,435 A | 8/1999 | Dobbek et al. |
| 5,950,223 A | 9/1999 | Chiang et al. |
| 5,968,180 A | 10/1999 | Baco |
| 5,983,293 A | 11/1999 | Murakami |
| 5,991,911 A | 11/1999 | Zook |
| 6,029,226 A | 2/2000 | Ellis et al. |
| 6,029,250 A | 2/2000 | Keeth |
| 6,041,417 A | 3/2000 | Hammond et al. |
| 6,065,053 A | 5/2000 | Nouri et al. |
| 6,067,206 A | 5/2000 | Hull et al. |
| 6,070,200 A | 5/2000 | Gates et al. |
| 6,078,447 A | 6/2000 | Sim |
| 6,081,849 A | 6/2000 | Born et al. |
| 6,092,231 A | 7/2000 | Sze |
| 6,094,320 A | 7/2000 | Ahn |
| 6,108,812 A * | 8/2000 | Born ..................... 714/807 |
| 6,124,994 A | 9/2000 | Malone, Sr. |
| 6,125,469 A * | 9/2000 | Zook et al. ............. 714/769 |
| 6,134,063 A | 10/2000 | Weston-Lewis et al. |
| 6,157,984 A | 12/2000 | Fisher et al. |
| 6,161,165 A * | 12/2000 | Solomon et al. .......... 711/114 |
| 6,178,486 B1 | 1/2001 | Gill et al. |
| 6,192,499 B1 | 2/2001 | Yang |
| 6,201,655 B1 | 3/2001 | Watanabe et al. |
| 6,223,303 B1 | 4/2001 | Billings et al. |
| 6,279,089 B1 | 8/2001 | Schibilla et al. |
| 6,297,926 B1 | 10/2001 | Ahn |
| 6,330,626 B1 | 12/2001 | Dennin et al. |
| 6,381,659 B1 | 4/2002 | Proch et al. |
| 6,401,149 B1 | 6/2002 | Dennin et al. |
| 6,467,060 B1 * | 10/2002 | Malakapalli et al. ....... 714/758 |
| 6,470,461 B1 | 10/2002 | Pinvidic et al. |
| 6,487,631 B1 | 11/2002 | Dickinson et al. |
| 6,490,635 B1 | 12/2002 | Holmes |
| 6,530,000 B1 | 3/2003 | Krantz et al. |
| 6,574,676 B1 | 6/2003 | Megiddo |
| 6,662,334 B1 | 12/2003 | Stenfort |
| 6,751,757 B1 * | 6/2004 | Biskup et al. ............. 714/54 |
| 6,760,814 B1 * | 7/2004 | Corrigan ................ 711/133 |
| 6,772,289 B1 * | 8/2004 | Corrigan ................ 711/118 |
| 6,826,650 B1 | 11/2004 | Krantz et al. |
| 2001/0044873 A1 | 11/2001 | Wilson et al. |

| | | | |
|---|---|---|---|
| 2003/0037225 | A1 | 2/2003 | Deng et al. |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Blathut R. Digital Transmission of Information (Dec. 4, 1990), pp. 429-430.

Hwang, Kai and Briggs, Faye A., "Computer Architecture and Parallel Processing" pp. 156-164.

Zeidman, Bob, "Interleaving DRAMS for faster access", System Design ASIC & EDA, pp. 24-34 (Nov. 1993).

P.M. Bland et. al. Shared Storage Bus Circuitry, IBM Technical Disclosure Bulletin, vol. 25, No. 4, Sep. 1982, pp. 2223-2224.

PCT search report for PCT/US00/07780 mailed Aug. 2, 2000, 4 Pages.

PCT Search Report for PCT/US01/22404, mailed Jan. 29, 2003, 4 Pages.

* cited by examiner

SYSTEM AND METHOD FOR PERFORMING PARITY CHECKS IN DISK STORAGE SYSTEM

CROSS REFERENCE TO RELATED APPLICATIONS

The disclosure in this application is related to the provisional patent application filed on May 7, 2002, Ser. No. 60/378,471, entitled "System and Method for Performing parity Checks in Disk Storage Systems", incorporated herein by reference in its entirety.

BACKGROUND OF THE INVENTION

1. Field of the Invention

The present invention relates generally to disk controllers, and more particularly to performing parity checks in disk storage systems using disk controllers.

2. Background

Conventional computer systems typically include several functional components. These components may include a central processing unit (CPU), main memory, input/output ("I/O") devices, and disk drives. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The main memory is typically smaller than disk drives and may be volatile. Programming data is often stored on the disk drive and read into main memory as needed. The disk drives are coupled to the host system via a disk controller that handles complex details of interfacing the disk drives to the host system. Communications between the host system and the disk controller is usually provided using one of a variety of standard I/O bus interfaces.

Typically, a disk drive includes one or more magnetic disks. Each disk typically has a number of concentric rings or tracks on which data is stored. The tracks themselves may be divided into sectors, which are the smallest accessible data units. A positioning head above the appropriate track accesses a sector. An index pulse typically identifies the first sector of a track. The start of each sector is identified with a sector pulse. Typically, the disk drive waits until a desired sector rotates beneath the head before proceeding a read or write operation. Data is accessed serially, one bit at a time and typically, each disk has its own read/write head.

The disk drive is connected to the disk controller that performs numerous functions, for example, converting digital data to analog head signals, disk formatting, error checking and fixing, logical to physical address mapping and data buffering. To perform the various functions for transferring data, the disk controller includes numerous components.

A conventional disk drive stores data bytes on disk drive platters in sets of a predetermined length. A disk drive controller or a host computer may generate error correction code (ECC) bytes and cyclic redundancy check (CRC) bytes for each set of data bytes. Sometimes, the host computer generates CRC bytes, and the disk controller generates its own set of CRC bytes. The CRC and the ECC bytes are appended to the end of the set of data bytes. The data bytes, CRC bytes and ECC bytes together make up a 'sector', and this sector is stored on the disk platter. When the disk drive controller reads a sector off the disk, the data bytes and CRC bytes are stored in a buffer unit (memory) in the disk drive. An ECC unit detects and corrects errors in the sector read off the platter. These corrections are made to the data bytes and CRC bytes stored in the buffer unit.

Conventional disk array storage systems may have multiple disk drives arranged and coordinated such that a single mass storage system is formed. This allows data to be stored at multiple disks and ensures continued operation if a disk fails. Data may be stored at multiple locations and if one component fails, data may be regenerated from redundant data stored at another component.

One way to achieve this redundancy is by using parity. In parity redundancy, redundant data is stored in one area of the storage system, however, the size of the redundant storage area is less than the remaining storage area used to store the original area.

A RAID (Redundant Array of Independent Disks) storage system is one technique, which is used to store redundant data. RAID includes various architectures, designated as RAID0, RAID1, RAID 2, RAID 3, RAID 4, and RAID 5.

A RAID 0 system is configured without any redundancy. RAID 1 has mirror redundancy.

RAID 2 through RAID 5 involves parity type redundant storage. For example, in RAID 5, the disks are divided into equally sized address areas ("blocks") and a set of blocks is referred to as "stripes". Each stripe has N blocks of data and one parity block, which contains redundant information.

Typically, to update a parity drive, old data from a storage media and new data for a write operation is compared (also referred to as XORed). The XOR operation is used to maintain data integrity.

FIG. 2A shows a simple example of a RAID topology that can use one aspect of the present invention, discussed below. FIG. 2 shows a RAID controller 220A coupled to plural disks 301, 302, 303 and 304 using ports 305 and 306. Data may be written from RAID system 300 to a host system 200 or vice-versa via RAID controller 220A.

One way to maintain data integrity is to use the CRC code. A typical circuit employing CRC error checking includes a CRC checker to verify integrity for old data and a CRC generator that generates CRC information for any new data.

Conventional techniques regenerate CRC on XOR data using logical block address ("LBA") values. CRC is typically seeded with an LBA value that helps protect against mis-positioning errors in ID-less sector formats. Usually the firmware (code operating the disk controller) knows the LBA for the sector involved and can preset a counter that is linearly updated as each sector is XOR'ed. When Skip operations are used, more firmware intervention will be required, since skip operations present discontinuities in the LBA progression. Conventional systems use firmware to handle the complexity involved in skip operations. However, this solution is slow and hence is not commercially desirable.

Another drawback in the conventional techniques is that any failure in the XOR logic goes undetected because CRC is regenerated on XOR data using logical block address ("LBA") values.

Therefore, what is desired is a system and method for efficiently performing XOR operation for maintaining data integrity.

SUMMARY OF THE INVENTION

In one aspect of the present invention, a system for maintaining cyclic redundancy check ("CRC") protection of XOR'ed data sectors is provided. The system includes a register that is initialized with a seed value; and logic for XOR combining CRC values of at least two sectors and for storing a result of the combination as modified with a seeded CRC value.

In another aspect, a disk controller that maintains cyclic redundancy check ("CRC") protection of XOR'ed data sectors is provided. The controller includes, a register that is conditioned with a seed value used for comparing plural sector CRC values; and logic for comparing CRC values of at least two sectors and storing a result of the comparison with a seeded CRC value.

In another aspect of the present invention, a method for maintaining CRC protection of XOR'ed data sectors is provided. The process includes, determining a CRC value ($CRC'_A$) for a first sector with a seed value; determining a CRC value ($CRC'_B$) for a second sector with a seed value; XOR combining the CRC value of the first sector calculated without a seed value ($CRC_A$) with the CRC value of the first sector calculated with a seed value ($CRC'_A$); and XOR combining the result with $CRC'_A$ and $CRC'_B$.

In one aspect of the present invention, the process does not require any knowledge of LBA values. By XOR'ing the stored CRC values with those recalculated using a zero seed, and combining the result with corresponding CRC values generated for another sector, a high level of confidence is achieved that the data is correct.

In one aspect of the present invention, any errors that occur in the XOR function can be detected when the data is transmitted to a host.

In yet another aspect of the present invention, the process can be easily modeled as an XOR combination of pre-corrected data with a sector of correction data consisting of a zero seed CRC and all zeroes data except in the locations of corrected bits. The correction data CRC can be XOR'ed with the pre-correction data CRC and the result will be the same as a CRC computed on the post-correction data.

In yet another aspect of the present invention, the CRC/XOR technique described above may be used in a RAID environment for maintaining data integrity.

In another aspect of the present invention, a method for maintaining CRC protection on XOR'ed data sectors in RAID systems is provided. The method uses parity without the need for firmware intervention to seed the LBA values into the CRC. This improves performance by reducing the requirement for firmware intervention in seeding the CRC accumulators, which is particularly important for "Skip operations" where LBA values may not increase linearly but may have discontinuities. This provides increased data protection integrity since it can utilize the originally generated CRC values rather than run the risk of re-computing CRC values on data which may be corrupted during the XOR operation.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a disk drive will initially be described. The specific architecture and operation of the preferred embodiment will then be described with reference to the general architecture and operation of a disk drive.

Figure 1:
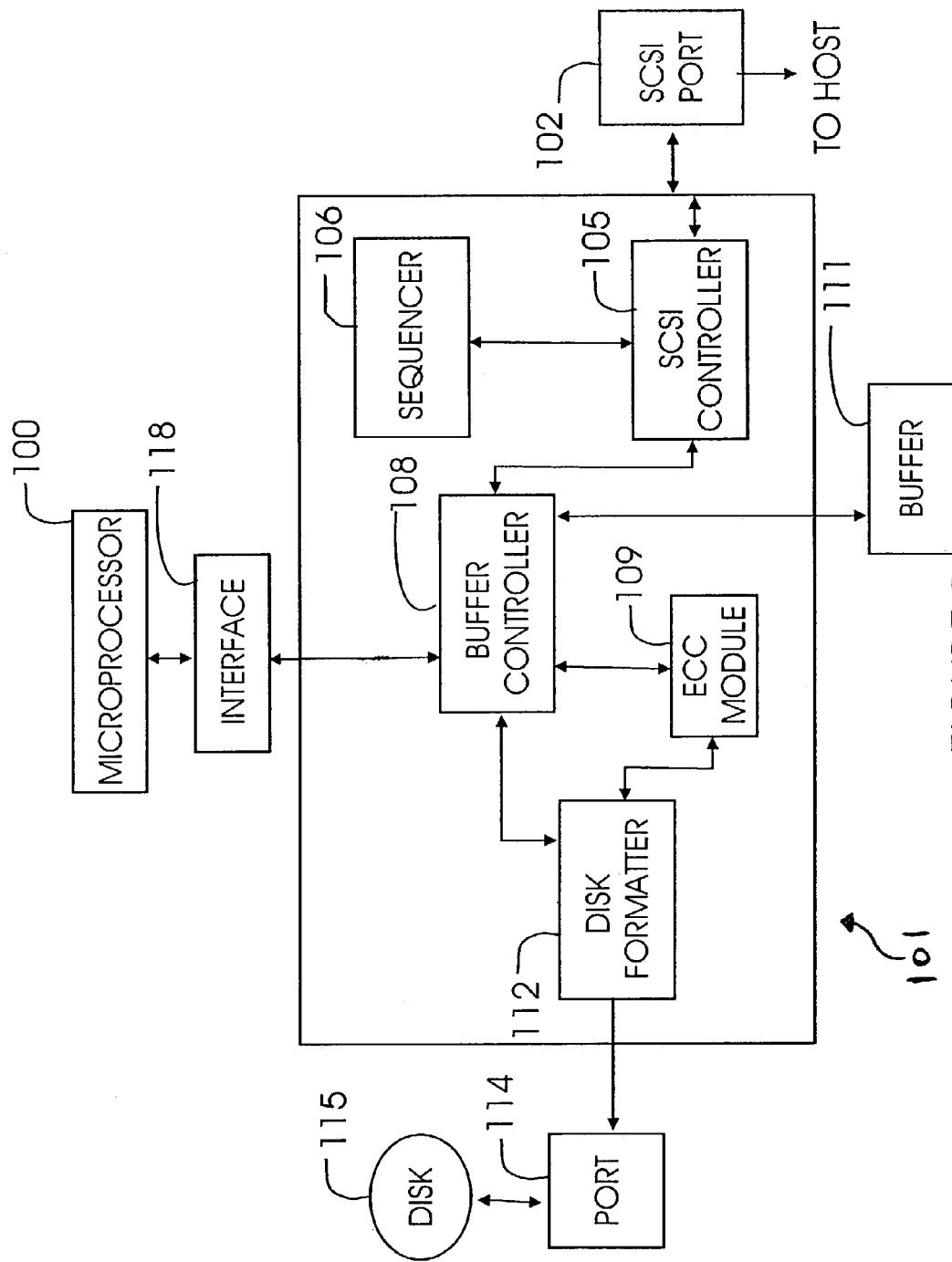
FIG. 1 shows a block diagram of a disk storage system.

The disk drive system of FIG. 1 is an example of an internal (hard) disk drive included in a computer system system. The host computer (not shown) and the disk drive communicate via port 102, which is connected to a data bus (not shown). In an alternate embodiment (not shown), the disk drive is an external storage device, which is connected to the host computer via a data bus. The data bus, for example, is a bus in accordance with a Small Computer System Interface (SCSI) specification. Those skilled in the art will appreciate that other communication buses known in the art can be used to transfer data between the disk drive and the host system.

As shown in FIG. 1, the disk drive includes disk controller 101, which is coupled to SCSI port 102, disk port 114, buffer memory 111 and microprocessor 100. Interface 118 serves to couple microprocessor bus 107 to microprocessor 100. A read only memory ("ROM") omitted from the drawing is used to store firmware code executed by microprocessor 100. Disk port 114 couples disk controller 101 to hard disk assembly (als referred to herein as "disk") 115.

As is standard in the industry, data is stored on disk 115 in sectors. Each sector is byte structured and includes various fields, referred to as the sector format. A typical sector format includes a logical block address ("LBA") of about four bytes followed by a data field of about 512 bytes. The LBA contains position information. A field for a CRC checksum of 4 bytes typically follows the data field. A subsequent field for a number of ECC bytes, for example 40–80 bytes, is located at the end of the sector.

Controller 101 can be an integrated circuit (IC) that comprises of various functional modules, which provide for the writing and reading of data stored on disk 115. Microprocessor 100 is coupled to controller 101 via interface 118 to facilitate transfer of data, address, and control information. Buffer memory 111 is coupled to controller 101 via ports to facilitate transfer of data, and address information.

SCSI controller 105 includes programmable registers and state machine sequencers that interface with SCSI port 102 on one side and to a fast, buffered direct memory access (DMA) channel on the other side.

Sequencer 106 supports customized SCSI sequences, for example, by means of an instruction memory that allows users to customize command automation features. Sequencer 106 support's firmware and hardware interrupts schemes.

Disk formatter 112 is a disk interface controller and performs control operations when microprocessor 100 loads all required control information and parameter values into a writable control store (WCS) RAM (not shown) and issues a command. Disk formatter 112 executes the command with no microprocessor 100 intervention.

Buffer controller 108 can be a multi-channel, high speed DMA controller. Buffer controller 108 connects buffer memory 111 to disk formatter 112 and to an ECC channel of ECC module 109, a SCSI channel of SCSI controller 105 and micro-controller bus 107. Buffer controller 108 regulates data movement into and out of buffer memory 111.

To read data from disk 115, a host system sends a read command to disk controller 101, which interrupts Microprocessor 100 which then fetches the command from disk controller 101 and initializes the various functional blocks of disk controller 101. Data is read from disk 115 and is passed through disk formatter 112 simultaneously to buffer controller 108 and to ECC module 109. Thereafter, ECC module 109 provides the ECC correction pattern for correcting errors, which occurred during the read operation, while data is still in buffer controller 108. The error is corrected and corrected data is sent to buffer memory 111, and then passed to the host system.

To write data, a host system (200) sends a write command to disk controller 101 and is stored in buffer 111. Microprocessor 100 reads the command out of buffer 111 and sets up plural registers. Data is transferred from host and is first stored in buffer 111, before being written to disk 115. CRC values are calculated based on the LBA for the sector being written. Data is read out of buffer 111, appended with ECC code and written to disk 115.

Figure 2A:
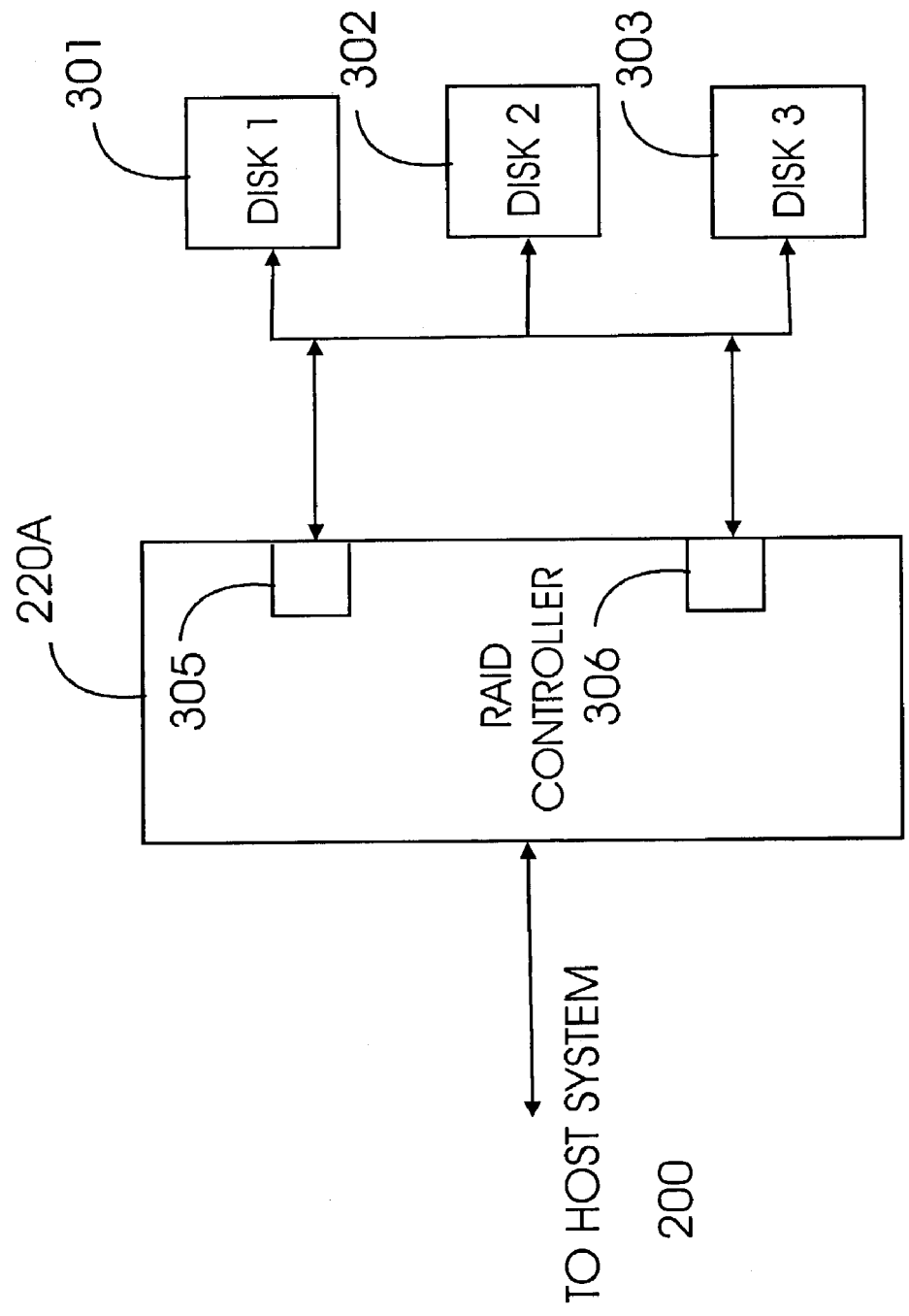
FIG. 2A is a block diagram of a RAID topology.
Figure 2B:
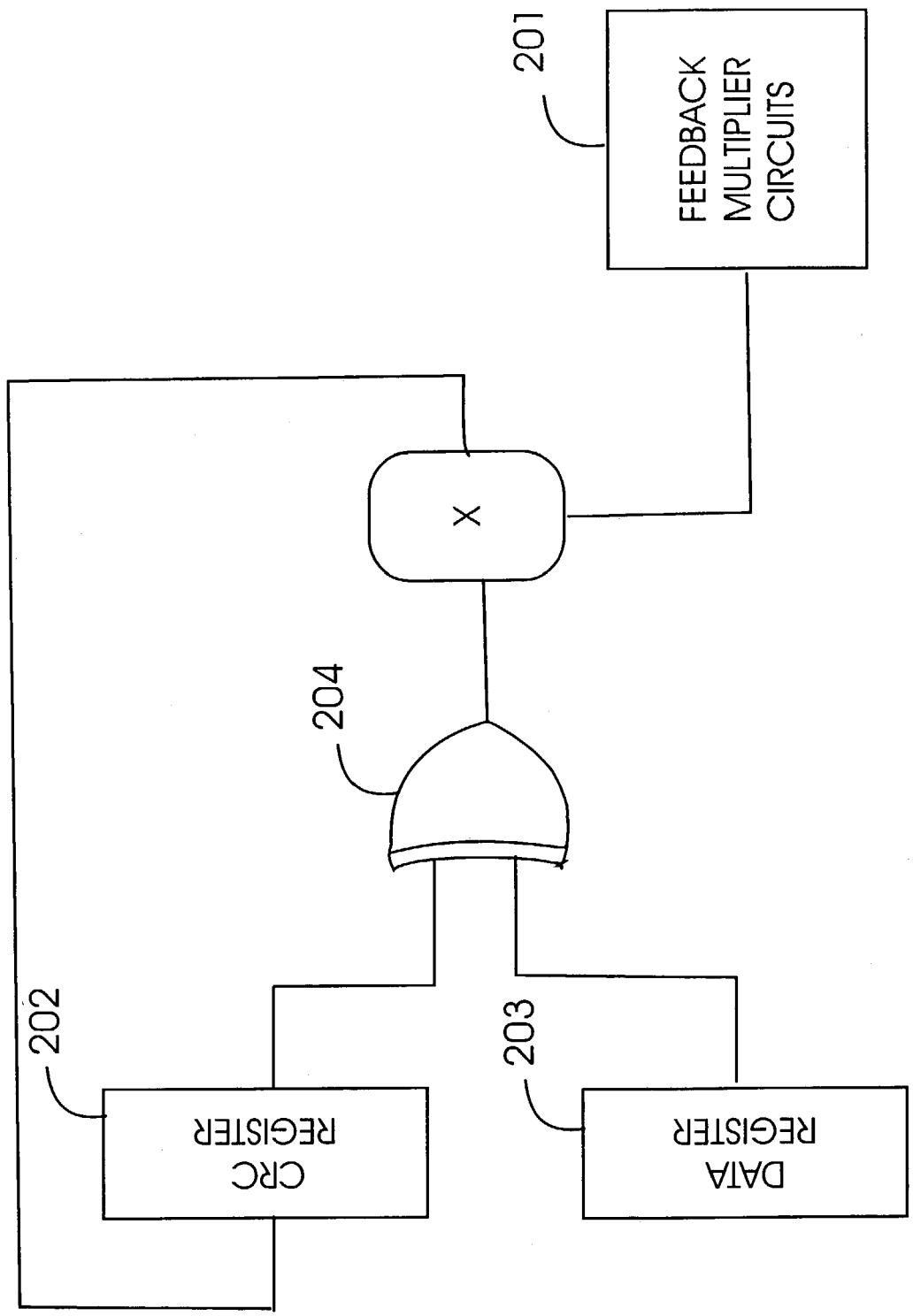
FIG. 2B is a block diagram of a CRC circuit, according to one aspect of the present invention.

XOR Operations:

To maintain data integrity, contents of plural buffers (buffers similar to buffer 111 or otherwise; or from multiple disks as in the RAID systems of FIG. 2B) are compared to each other. For example, contents of a first buffer ("New Data Buffer" or buffer 1) sent by the host system is summed modulo 2 to the contents of the second buffer ("Original Data Buffer" or buffer 2).

Modulo two summation is performed by means of an XOR operation and the resulting XOR value is stored in original data buffer (e.g. buffer 111). The purpose of the summation is to prepare the data for a parity drive. The parity drive contains sector by sector modulo-2 summation of data from all the drives included in a redundant drive set. For example in redundant drive set (similar to the drive set of FIG. 2A) may have three drives A, B, and C and a Parity Drive P (could be drive 3 303 of FIG. 2A if the set had two drives and a parity drive). Sector n on P drive=Sector n on A+sector n on B+sector n on C taken modulo two. The parity drive thus incorporates the modulo two summation of the redundant drive string taken sector by sector.

When a write operation is performed to one of the drive string, for example, drive A (drive 1 301, FIG. 2A), the data on drive A is changed to the "New" data. The Parity drive is also updated accordingly. One way to update is to subtract the "original" data that drive A contained and add the "new" data.

In modulo two arithmetic, addition and subtraction are identical, so the Parity drive is updated with the sum of the new and old data taken modulo 2. This is the XOR of the new and old data.

It is important to maintain the integrity of the data in these operations. The CRC bytes for the sector are stored along with the sector data in various buffers (for example, buffer 111) and can participate in the XOR operation to help evaluate the integrity of the XOR result.

Various registers may be used, according to one aspect of the present invention, to configure the XOF operations, as discussed below:

(1) XOR Buffer 1 Address Register: This register contains address pointer for the New Data Buffer from the host.

(2) XOR Buffer-2 Address: This contains address pointer for the Original Data Buffer.

(3) XOR Block Count: This determines the number of XOR blocks of data to transfer or XOR.

The foregoing registers may be located in buffer controller 108.

Figure 3:
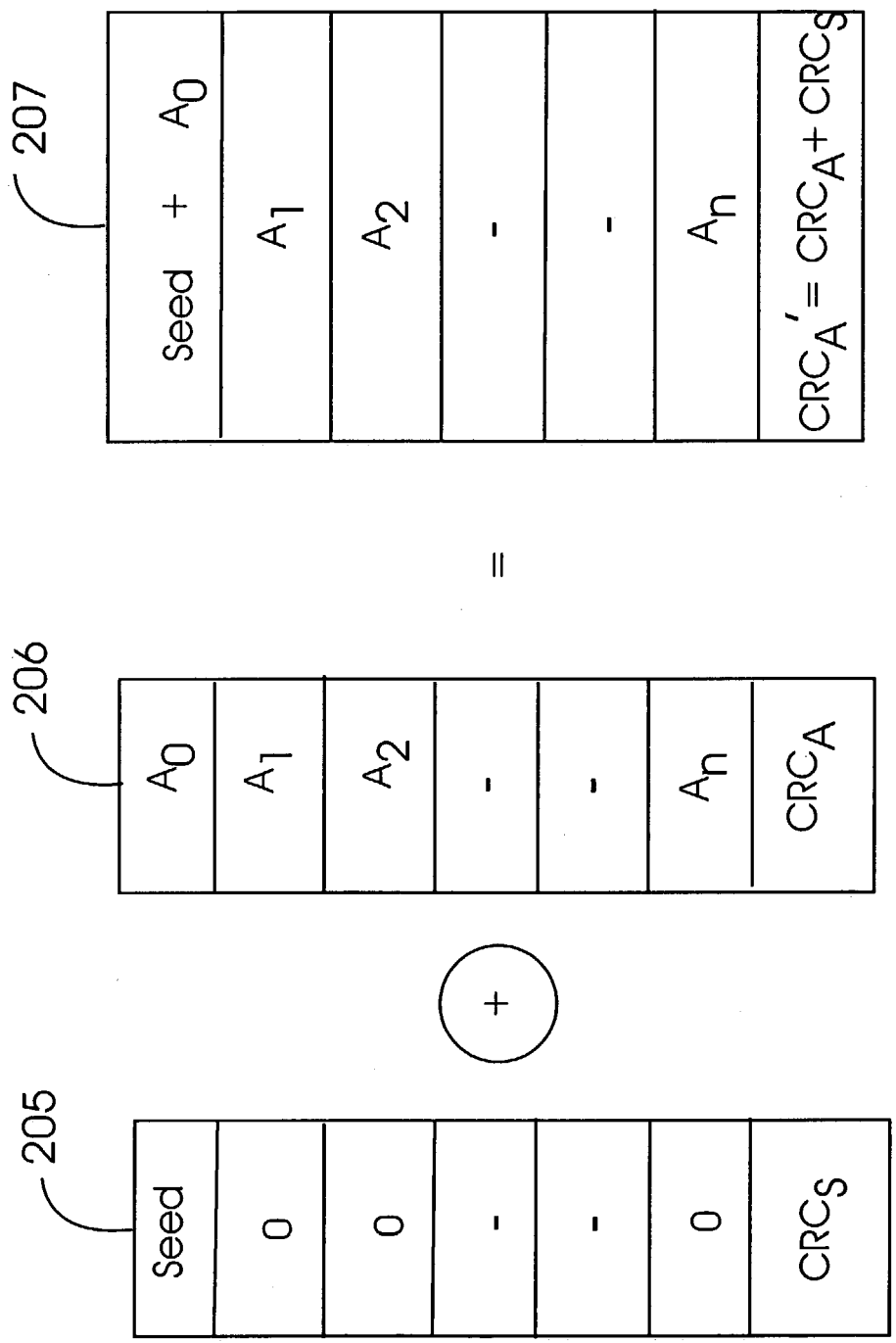
FIG. 3 is a block diagram showing seeded CRC values of data sectors, according to one aspect of the present invention.

To understand the various adaptive aspects of the present invention, a brief understanding of CRC background is provided with respect to FIGS. 2B and 3 of the present invention.

Typically CRC applications are linear using mod-2 arithmetic, which implies that:

$$f(A)+f(B)=f(A+B) \text{ and}$$

$$f(A)f(B)=f(AB)$$

CRCs are applied to message words as if the message word were coefficients of a polynomial. In addition, they are applied using mod-2 arithmetic. CRCs are computed by dividing the polynomial defined by the message word with an irreducible polynomial that defines the CRC characteristic. Since the message word is handled in its binary format, all arithmetic is performed by modulo 2, which is the same as modulo 2 subtraction, and is equivalent to the logical XOR operation.

For CRC, XOR operations on two data fields is equal to the modulo-2 addition of coefficients for each of the polynomials represented by data bits in the message words. Since a mod(x)+b mod(x)=(a+b) mod(x), the CRCs for XOR'ed data are equivalent to the XOR'ed values for the CRC of each data word.

FIG. 2B shows an example of a parallel CRC implementation, according to one aspect of the present invention. In the parallel CRC implementation, a CRC register 202 maintains a current CRC residue value. The CRC residue value is XOR'ed (added modulo 2) 204 to a current data value, which may be a 32 bit value. The sum is passed through feedback multiplier circuit 201. The remainder (the result of the modulo polynomial division in the feedback multiplier) is stored as the new residue in CRC register 202.

When CRC register 202 is initialized with a zero seed value, the first data word is passed through unaffected as input to feedback multiplier circuit 201. The existing CRC register 202 value prior to being applied at the feedback multiplier circuit 201 then conditions all subsequent words. The CRC is a running remainder of a division operation. XOR gate 204 subtracts the previous remainder from the next symbol set of the data polynomial prior to performing the modulo polynomial division in the feedback multiplier circuit 201.

When CRC register is primed with a non-zero seed value, the first data word of the message will have that value subtracted from its prior division, as described below with reference to FIG. 3.

FIG. 3 illustrates the linearity of CRC with respect to the application of a seed value. The effect of the seed can be modeled by viewing the Seeded CRC'$_A$ value as the sum of an unseeded CRC$_A$ on A$_0$:A$_n$ and the CRC'$_S$ on the seed followed by n words of zero.

Impact of non-zero seed values on XOR'ed sectors:

For illustration purposes, if two sectors, A and B are XOR'ed, then the relationship of their CRCs is computed, as described below. Assume that both sectors A and B have the same seed value, then:

$$CRC_{A+B} = CRC_A + CRC_B + CRC_S + CRC_S = CRC_A + CRC_B$$

However, the object is to include the seed in the XOR'ed data as well. If the CRC were computed on the XOR data, as performed by conventional techniques, the resulting CRC would again include CRC$_S$. Therefore the CRC recomputed on the XOR data can be computed from the XOR'ed CRC if the value of CRC$_S$ is known:

$$CRC_{XOR(A,B)} = CRC_A + CRC_B + CRC_S = CRC_A' + CRC_B' + CRC_S$$

CRC$_S$ can be determined by calculating CRC$_A$ and/or the CRC$_B$ value as data is extracted from buffer 111 to be XOR'ed. Once CRC$_A$ is known it can be added to CRC$_A$' (which was stored with sector A in buffer 111 or any other buffer) to obtain CRC$_S$ $$CRC_S = CRC_A + CRC_A'$$

Figure 4:
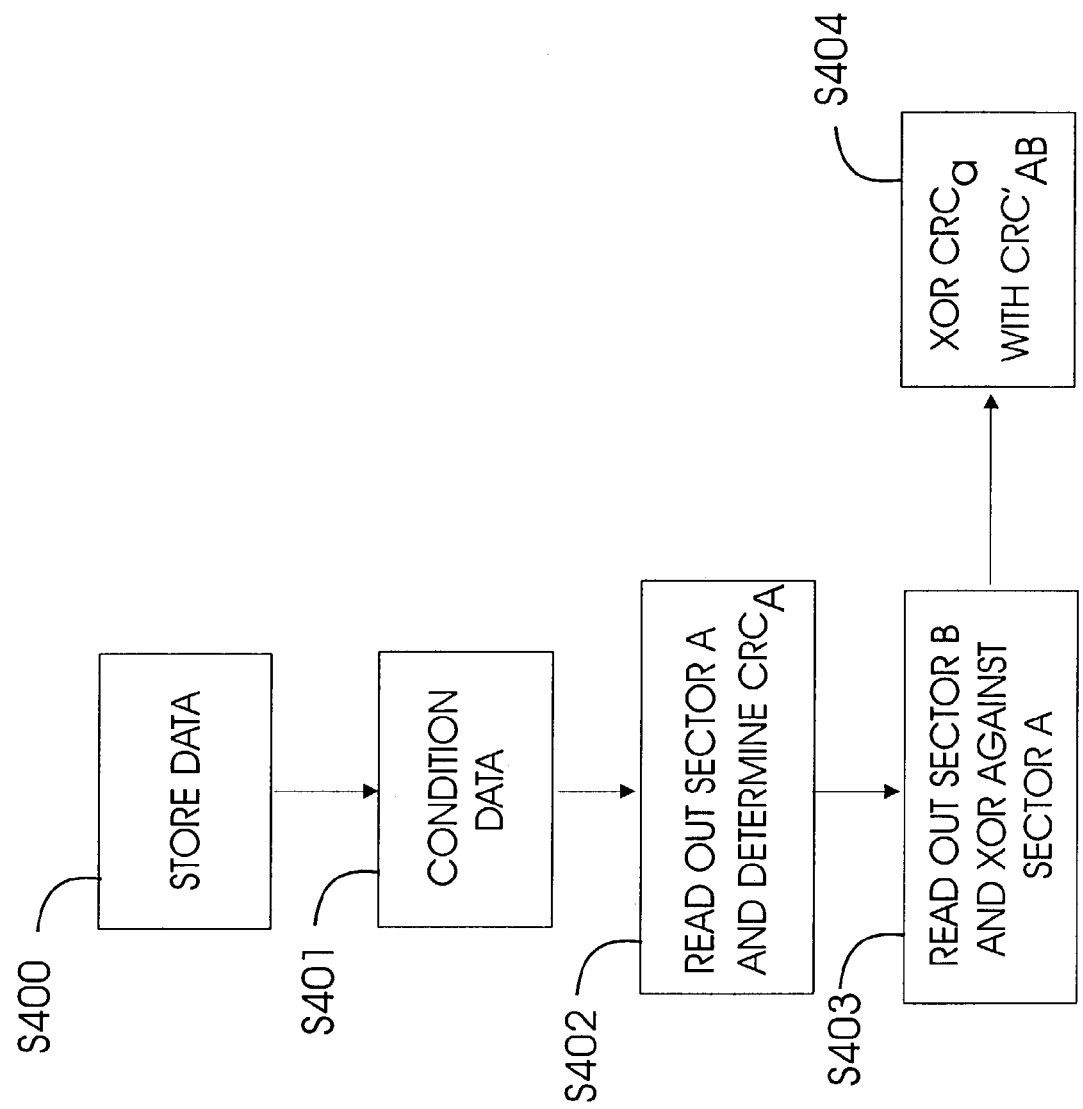
FIG. 4 is a flow diagram of executable process steps to XOR CRC vales, according to one aspect of the present invention.

The following procedure may be used to compute the CRC for the XOR'ed data that does not require the use of LBA data, as described below with respect to FIG. 4.

In step S400, the process stores sector A and sector B data in buffer 111 or any other buffer, including a XOR FIFO (not shown). The seeded CRC values (CRC'$_A$ and CRC'$_B$) are stored along with Sector A and B having been seeded with the appropriate LBA values.

In Step S401, the process conditions CRC module (for example, register 202) with a '0' seed. This is used to compute CRC$_A$.

In step S402, the process reads out sector A with the stored CRC value (CRC'$_A$), and stores it in temporary storage (not shown).

In step S403, the process reads Sector B with CRC'$_B$. Sector B is XORed against any temporary intermediate stored values of Sector A (from step S402). Hence CRC'$_A$ and CRC'$_B$ are XORed which provides CRC'$_{AB}$. The XORed result (CRC'$_{AB}$) is stored in temporary storage.

In step S404, the process reads CRC$_A$, and then XOR's CRC$_A$ with CRC'$_A$ and CRC'$_{AB}$. The result is saved as CRC$_{XOR(A,B)}$.

The foregoing process does not require any knowledge of LBA values. By XOR'ing the stored CRC values with those recalculated using a zero seed, and comparing to the same values generated for sector B, a high level of confidence is achieved that the data is correct.

In one aspect of the present invention, any errors that occur in the XOR function can be detected when the data is transmitted to a host.

In another aspect of the present invention, the LBA value can be extracted if sector data and CRC$_A$' are known.

In yet another aspect, the foregoing CRC adjustment algorithm can be easily modeled as an XOR combination of pre-corrected data with a sector of correction data consisting of a zero seed CRC and all zeroes data except in the locations of corrected bits. The correction data CRC can be XOR'ed with the pre-correction data CRC and the result will be the same as a CRC computed on the post-correction data.

In yet another aspect, the CRC/XOR technique described above may be used in a RAID environment for data maintaining data integrity.

In another aspect, a method for maintaining CRC protection on XOR'ed data sectors in RAID systems is provided. The method uses parity without the need for firmware intervention to seed the LBA values into the CRC. This improves performance by reducing the requirement for firmware intervention in seeding the CRC accumulators, which is particularly important for "Skip operations" where LBA values may not increase linearly but may have discontinuities. This provides increased data protection integrity since it can utilize the originally generated CRC values rather than run the risk of re-computing CRC values on data which may be corrupted during the XOR operation.

The term storage device, system, disk, disk drive and drive are used interchangeably in this description. The terms specifically include magnetic storage devices having rotatable platter(s) or disk(s), digital video disks(DVD), CD-ROM or CD Read/Write devices, removable cartridge media whether magnetic, optical, magneto-optical and the like.

Although the present invention has been described with reference to specific embodiments, these embodiments are illustrative only and not limiting. Many other applications and embodiments of the present invention will be apparent in light of this disclosure and the following claims.

What is claimed is:

1. A system for maintaining cyclic redundancy check ("CRC") protection of XOR'ed data sectors, comprising:
    a register that is initialized with a non-zero seed value used for generating sector CRC values; and
    logic for combining CRC values of at least two sectors and storing a result of the combination modified with a non-zero seeded CRC value.

2. The system of claim 1, wherein CRC data of a sector is XORed with CRC data of another sector.

3. The system of claim 1, wherein the logic for combining CRC values is XOR logic.

4. A disk controller that maintains cyclic redundancy check ("CRC") protection of XOR'ed data sectors, comprising:
    a register that is initialized with a non-zero seed value used for generating sector CRC values; and
    logic for combining CRC values of at least two sectors and storing a result of the combination modified with a non-zero seeded CRC value.

5. The controller of claim 4, wherein CRC data of a sector is XORed with CRC data of another sector.

6. The controller of claim 5, wherein the logic for combining CRC values is XOR logic.

7. A method for maintaining CRC protection of XOR'ed data sectors, comprising:
    determining a CRC value (CRC'$_A$) for a first sector as calculated with a seed value;
    determining a CRC value (CRC'$_B$) for a second sector as calculated with a seed value;
    combining the CRC value of the first sector calculated without a seed value (CRC$_A$) with the CRC value of the first sector calculated with a seed value (CRC'$_A$); and
    combining the result with CRC'$_A$ and CRC'$_B$.

* * * * *

UNITED STATES PATENT AND TRADEMARK OFFICE
CERTIFICATE OF CORRECTION

PATENT NO. : 7,111,228 B1  Page 1 of 1
APPLICATION NO. : 10/429495
DATED : September 19, 2006
INVENTOR(S) : Paul B. Ricci It is certified that error appears in the above-identified patent and that said Letters Patent is hereby corrected as shown below:

Column 4, Line 13   Delete "vale" and insert -- values --
Column 4, Line 27   Delete second occurrence of "system"
Column 4, Line 44   Delete "als" and insert -- also --
Column 6, Line 7    Delete "XOF" and insert -- XOR --

Signed and Sealed this

Fourth Day of December, 2007

JON W. DUDAS
*Director of the United States Patent and Trademark Office*